(12) United States Patent
Shiraiwa

(10) Patent No.: US 6,962,468 B2
(45) Date of Patent: Nov. 8, 2005

(54) CLAMPING DEVICE FOR TOOL HOLDER

(75) Inventor: Akio Shiraiwa, Waldwick, NJ (US)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/688,998

(22) Filed: Oct. 21, 2003

(65) Prior Publication Data

US 2004/0136793 A1    Jul. 15, 2004

(30) Foreign Application Priority Data

Oct. 25, 2002  (JP) .............................. 2002-311444
Nov. 13, 2002  (JP) .............................. 2002-329837
Aug. 19, 2003  (JP) .............................. 2003-207909

(51) Int. Cl.[7] .............................................. B23P 15/28
(52) U.S. Cl. ........................ 407/77; 407/108; 407/94
(58) Field of Search .................... 82/158, 160; 407/94, 407/101, 108, 85, 88, 67, 76, 77, 36, 44

(56) References Cited

U.S. PATENT DOCUMENTS

| 106,248 | A | * | 8/1870 | Fish ........................... 74/424.6 |
|---|---|---|---|---|
| 2,716,799 | A | * | 9/1955 | Bader .......................... 407/67 |
| 3,214,825 | A | * | 11/1965 | Williams ...................... 407/79 |
| 3,811,162 | A | * | 5/1974 | Bay ............................ 407/108 |
| 3,865,164 | A | * | 2/1975 | Sybertz ....................... 144/230 |
| 5,209,610 | A | * | 5/1993 | Arai et al. .................... 407/36 |
| 5,395,186 | A | * | 3/1995 | Qvart .......................... 407/46 |
| 5,669,742 | A | * | 9/1997 | Sjoo et al. ................... 407/105 |

FOREIGN PATENT DOCUMENTS

JP    2000-190110    7/2000
JP    2001-300802    10/2001

* cited by examiner

Primary Examiner—Willmon Fridie, Jr.
(74) Attorney, Agent, or Firm—Burns, Doane, Swecker & Mathis, LLP

(57) ABSTRACT

A tool assembly includes a support body, a clamping device, and a tool holder clamped in a groove of the support body. A stopper block is disposed in the groove and abuts against the tool holder for positioning the tool holder along an axis. The stopper block is held in place by a wedge-type stopper clamp which applies a clamping force to the stopper block in a direction transversely of the axis. A wedge-type holder clamp is provided for applying a clamping force to the tool holder in a direction transversely of the axis. The stopper clamp is secured to the support body by a single fastening bolt, and the holder clamp is attached to the support body by a single fastening bolt. Each of the fastening bolts is provided with a part that forcefully pushes the respective clamp away from the support body in response to loosening of the fastening bolt. The arrangement is such that the tool holder can be inserted and removed without completely removing the holder clamp or its fastening bolt.

16 Claims, 16 Drawing Sheets

Fig. 1(a-1)
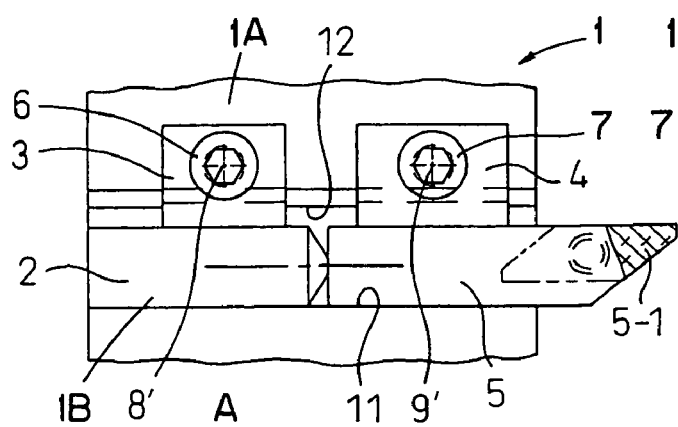
Fig. 1(a-2)
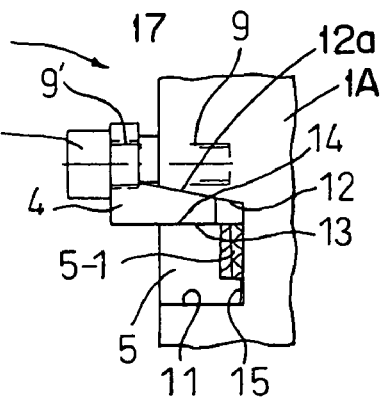
Fig. 1(b-1)
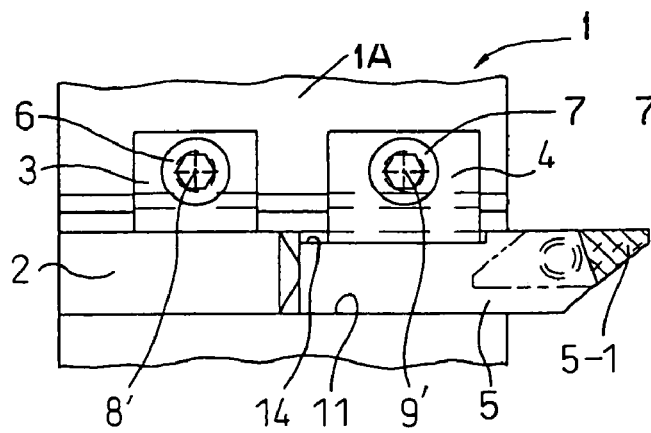
Fig. 1(b-2)
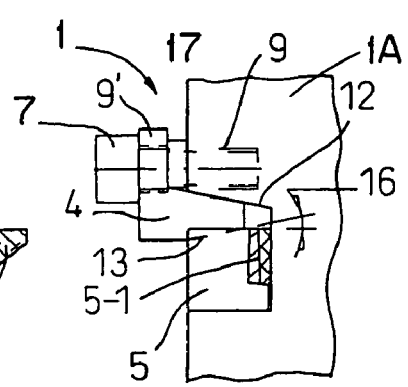

Fig. 4(a-1)
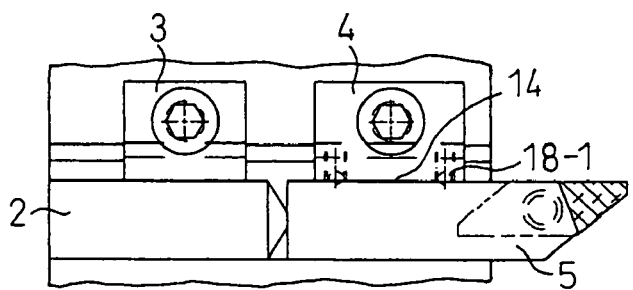
Fig. 4(a-2)
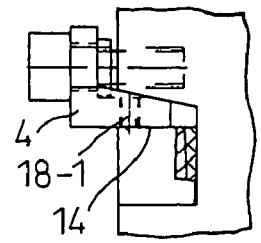
Fig. 4(b-1)
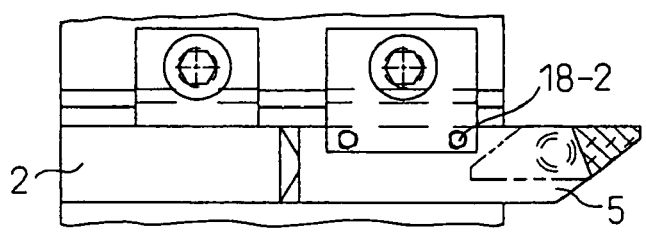
Fig. 4(b-2)
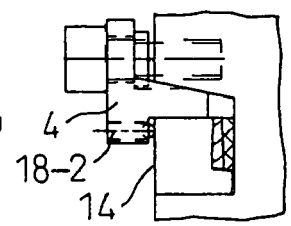
Fig. 4(c-1)
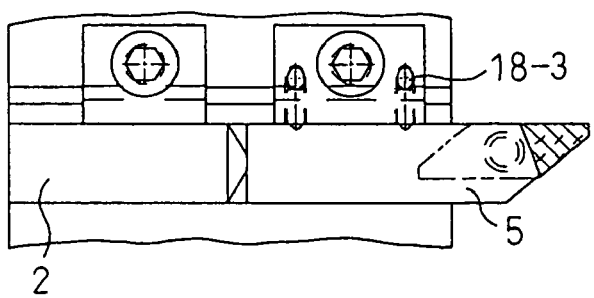
Fig. 4(c-2)
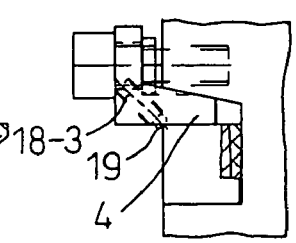

Fig. 5(a-3) Fig. 5(a-1)
Fig. 5(a-2)
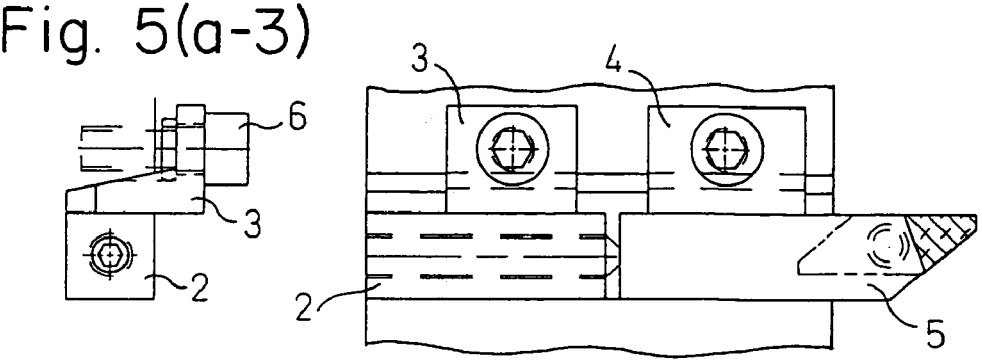
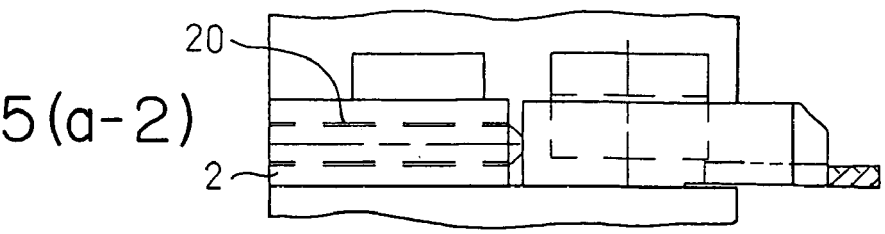
Fig. 5(b-2) Fig. 5(b-1)
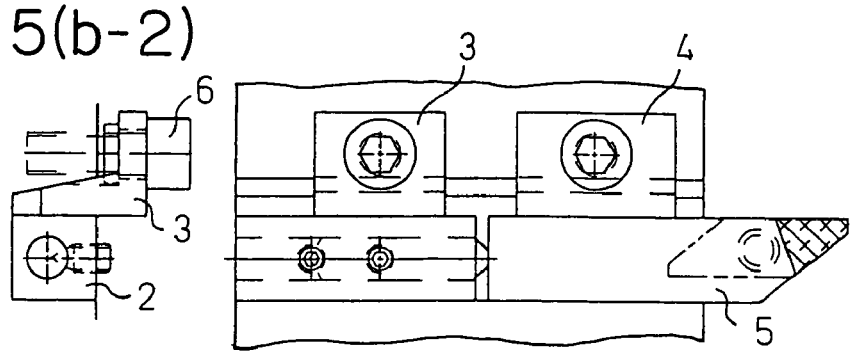
Fig. 5(b-4)
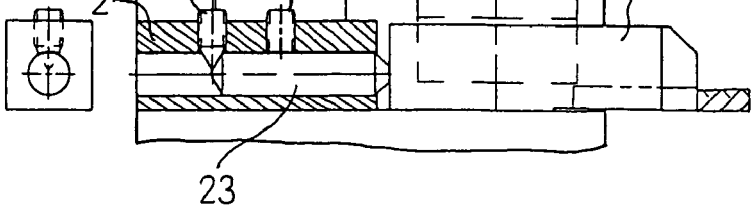
Fig. 5(b-3)

Fig. 6(a-1)
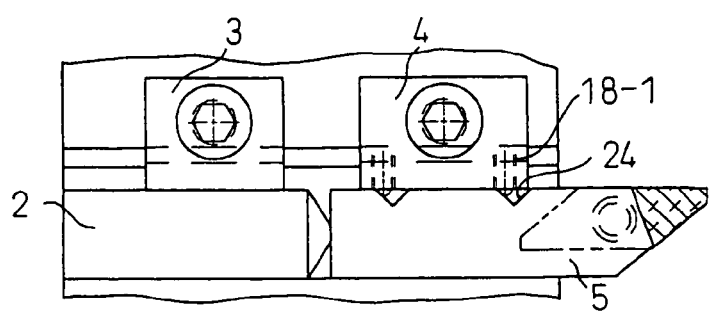
Fig. 6(a-2)
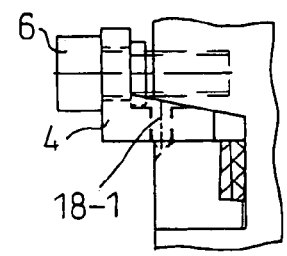
Fig. 6(b-1)
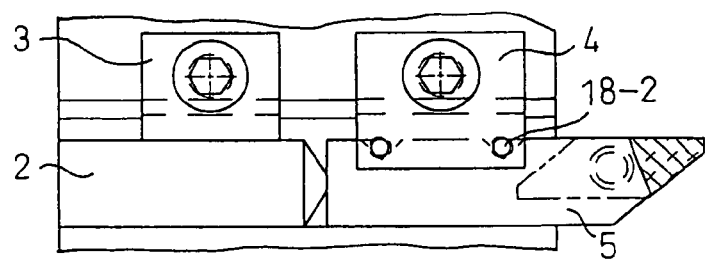
Fig. 6(b-2)
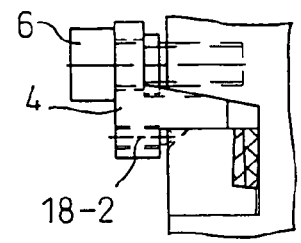
Fig. 6(c-1)
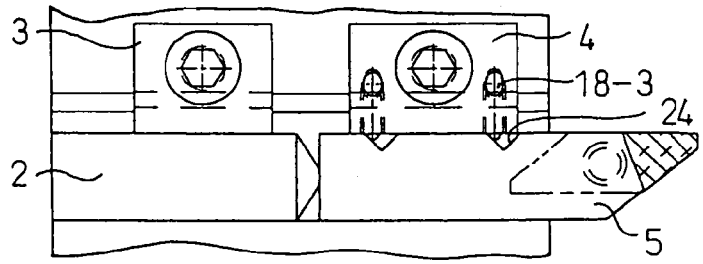
Fig. 6(c-2)
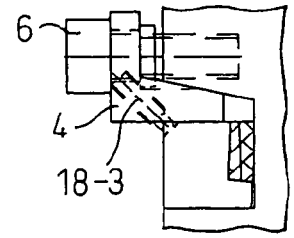

CLAMPING DEVICE FOR TOOL HOLDER

This application claims priority under 35 U.S.C. §§119 and/or 365 to Patent Application Serial No. 2002-311444 filed in Japan on Oct. 25, 2002; Patent Application No. 2002-329837 filed in Japan on Nov. 13, 2002; and Patent Application No. 2003-207909 filed in Japan on Aug. 19, 2003. The entire contents of those applications are incorporated herein by reference.

BACKGROUND OF THE INVENTION

The present invention relates to a clamping device for attaching a tool holder to various kinds of machine tools including a lathe, a numerical controlled lathe and an automatic copying lathe.

A conventional tool assembly 101 comprising a support body 102 and a plurality of tool holders 111 is depicted in FIG. 8. A clamping device for each tool holder 111 shown in FIG. 8 is provided with a wedge-type holder clamping tool 112 having a plurality of fastening bolts 114 and one jack-up bolt 113. A plurality of fastening bolts of the wedge-type holder clamping tool are fastened to the support body 102, so that the tool holder can be connected to the support body via interaction between respective wedge surfaces (not shown) of the wedge-type holder clamping tool 112 and the support body, which interaction pushes the clamping tool 112 against the tool holder 111. When the tool holder is to be removed from the clamping device, the jack-up bolt 113 that has been loosened in advance is screwed against the support body after the plural clamping bolts are loosened, so that the wedge surface of the wedge-type holder clamping tool is forcefully moved away from the wedge surface of the support body. Thus, the tool holder can be removed.

Various kinds of devices for simplifying attachment/removal of the tool holder are well known. A device for holding a tool holder shank in a machine tool is disclosed in Japanese Unexamined Patent Publication No. 2000-190110. The device releasably holds a holder shank of the tool holder to which a cutting insert is attached and a lock rod is provided on a base member. The attachment/removal structure between the holder shank and the lock rod is complicated and it is difficult to reduce the size of the device.

Japanese Unexamined Patent Publication No. 2001-300802 discloses a detachable securing mechanism of a cutting tool used in a comb-type tool rest of a machine tool such as a numerical controlled lathe. The mechanism is provided with a supporting member for supporting an arrangement of plural tools. The supporting member attaches the cutting tool to the comb-type tool rest of the machine tool by fastening a plurality of mounting bolts.

However, in the above conventional clamping device for a tool holder, it takes a long time to attach/remove the tool holder because it is required that a plurality of clamping bolts are fastened or loosened in attachment/removal of the tool holder.

Accordingly, there is a problem in miniaturization and simplification of the device because the structure of the device is complicated. In addition, it is difficult to repeatedly and accurately set the position of a top cutting edge because the placement of the cutting holder at a predetermined position must be visually checked.

In view of the above conventional prior art, the object of the present invention is to provide a clamping tool capable of reducing an attachment/removal time when one or plural tool holders, especially small tool holders, are attached to or removed from the machine tool such as the lathe, the numerical controlled lathe and the automatic copying lathe, and capable of improving the accuracy in positioning of the tool holder.

SUMMARY OF THE INVENTION

In a clamping device to which one or plural tool holders are attached, according to the present invention, the entire length of a wedge-type holder clamping tool for fastening the tool holder to the clamping device is shorter than that of a conventional clamping tool, and only one fastening bolt is provided on the wedge-type holder clamping tool. When the one fastening bolt is loosened, the clamping tool is forcefully displaced away from the support body, so that the tool holder can be attached to or removed from the clamping device. Preferably, this is done without completely removing the clamping tool or the fastening bolt.

With this structure, in the clamping device for the tool holder according to the present invention, the number of the fastening bolts can be reduced and a jack-up bolt can be dispensed with, and thus a miniaturization and simplification of the wedge-type holder clamping tool can be archived. In addition, the reduction of time required for attaching/removing the tool holder to/from the clamping device can be archived without modifying a tool holder generally and currently used.

Furthermore, in the clamping device to which the one or plural tool holders are attached, according to the present invention, the clamping device for the tool holder is provided with a stopper block provided at the rear end of the tool holder remotely of a cutting edge of the tool holder, and a wedge-type stopper clamping tool is provided for securing the stopper block to a predetermined position. Thus, the position of the tool holder can be accurately controlled when the tool holder is attached to the clamping device.

Furthermore, the wedge-type holder clamping tool according to the present invention is provided with a mounting bolt so that the tool holder can be attached to the clamping device with stability. The mounting bolt is replaced with an elastic mounting tool or a mounting bolt with an elastic mounting tool, so that the tool holder can be attached to the clamping device with further stability.

BRIEF DESCRIPTION OF THE DRAWINGS

The objects and advantages of the invention will become apparent from the following detailed description of preferred embodiments thereof in connection with the accompanying drawings in which like numerals designate like elements.

FIG. 1(*a*-1) shows a side view of a tool assembly according to the present invention, with a tool holder secured in place.

FIG. 1(*a*-2) is an end view of FIG. 1(*a*-1).

FIG. 1(*b*-1) is a view similar to FIG. 1(*a*-1) of a second embodiment according to the present invention.

FIG. 1(*b*-2) is an end view of FIG. 1(*b*-1).

FIG. 2(*b*) is a side view of a different fastening bolt having a groove therein for receiving an elastic ring.

FIG. 2(*c*) is a view similar to FIG. 2(*b*) with the elastic ring mounted in the fastening bolt.

FIG. 4(*a*-1) is a view similar to FIG. 1(*a*-1) of a further embodiment according to the present invention.

FIG. 4(*a*-2) is an end view of FIG. 4(*a*-1).

FIG. 4(*b*-1) is a view similar to FIG. 1(*a*-1) of still another embodiment according to the present invention.

FIG. 4(*b*-2) is an end view of FIG. 4(*b*-1).

FIG. 4(*c*-1) is a view similar to FIG. 1(*a*-1) of still another embodiment according to the present invention.

FIG. 4(*c*-2) is an end view of FIG. 4(*c*-1).

FIG. 5(*a*-1) is a view similar to FIG. 1(*a*-1) of another embodiment according to the present invention.

FIG. 5(*a*-2) is a plan view of FIG. 5(*a*-1).

FIG. 5(*a*-3) is an end view of FIG. 5(*a*-1).

FIG. 5(*b*-1) is a view similar to FIG. 1(*a*-1) of still another embodiment according to the present invention.

FIG. 5(*b*-2) is an end view of FIG. 5(*b*-1).

FIG. 5(*b*-3) is a sectional view through FIG. 5(*b*-1).

FIG. 5(*b*-4) is an end view of FIG. 5(*b*-3).

FIG. 6(*a*-1) is a view similar to FIG. 1(*a*-1) of still another embodiment according to the present invention.

FIG. 6(*a*-2) is an end view of FIG. 6(*a*-1).

FIG. 6(*b*-1) is a view similar to FIG. 1(*a*-1) of still another embodiment according to the present invention.

FIG. 6(*b*-2) is an end view of FIG. 6(*b*-1).

FIG. 6(*c*-1) is a view similar to FIG. 1(*a*-1) of still another embodiment according to the present invention.

FIG. 6(*c*-2) is an end view of FIG. 6(*c*-1).

FIG. 7(*b*) is a plan view of FIG. 7(*a*).

FIG. 7(*c*) is an end view of FIG. 7(*b*).

FIG. 9(*b*) is a sectional view through the spring plunger screw of FIG. 9(*a*).

FIG. 9(*c*) is an opposite end view of the spring plunger screw of FIG. 9(*a*).

DETAILED DESCRIPTION OF PREFERRED EMBODIMENTS

Figure 2A:
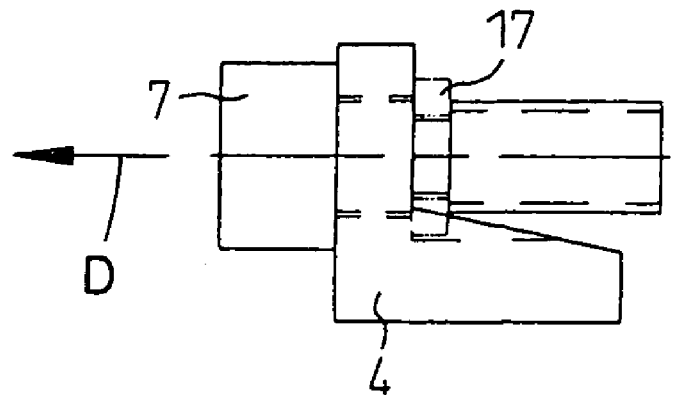
FIG. 2(*a*) is a side view of a fastener bolt extending through a holder clamp and carrying an elastic ring, according to the present invention.

Depicted in FIG. 1(*a*-1) is a tool assembly comprising a support body 1A, a tool holder 5 mounted in a groove 1B of the support body, and a clamping device for clamping the tool holder. The tool holder carries a replaceable cutting insert 5-1. In practice, there would be numerous tool holders with respective clamping devices, but only one tool holder is depicted herein. The clamping device includes a stopper block 2 disposed behind the tool holder for positioning the tool holder along an axis A, a wedge-type stopper clamping tool (stopper clamp) 3 for clamping the stopper block in place, a first fastener 6 for securing the clamping tool 3 to the support body 1A, a wedge-type holder clamping tool (holder clamp) 4 for clamping the tool holder in place, and a second fastener 7 for securing the clamping tool 4 to the support body 1A. The fastener 6 extends through a through-hole 8' formed in the stopper clamp 3, and is secured in the support body 1A by a thread connection. The fastener 7 is similarly attached. Thus, each fastener 6, 7 has a threaded shank that can be directly threaded to the support body, or indirectly thereto as explained in connection with FIGS. 10–16.

With the above structure, the fastening bolts 6, 7 are rotated in a fastening direction so that the wedge-type stopper clamping tool 3 and the wedge-type holder clamping tool 4 are fastened to the support body 1A, respectively, and are rotated in a loosening direction so that the wedge-type stopper clamping tool 3 and the wedge-type holder clamping tool 4 are moved away from the support body 1A, and thus the tool holder can be detachably attached to the support body.

In the support body 1A (to which, for example, one tool holder is attached in the following embodiments) that is shown in FIGS. 1(*a*-1) and 1(*a*-2), wedge surfaces 12*a*, 12*b* of the tool 4 and the support body 1A engage one another to force the tool 4 downwardly against the tool holder 5. Thus, a side face 13 of the wedge-type holder clamping tool 4 and a side face 14 of the tool holder 5 are clamped to each other by forces directed at right angles to the axis A and to a groove bottom (abutment surface) 15 of the support body 1A. In the support body 1A shown in FIGS. 1(*b*-1) and 1(*b*-2), the side face 13 of the wedge-type holder clamping tool 4 is clamped, at an angle 16, to the side face 14 of the tool holder 5. To this end, the side face 13 of the tool holder must be oriented at an angle 16 shown in FIG. 1(*b*-2).

Figure 2B:
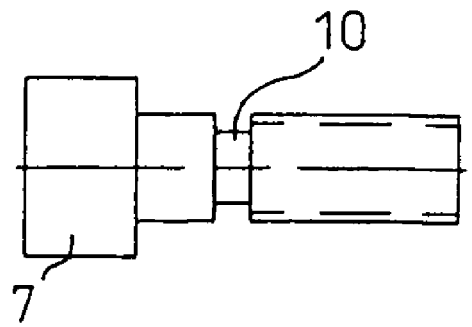
Figure 2C:
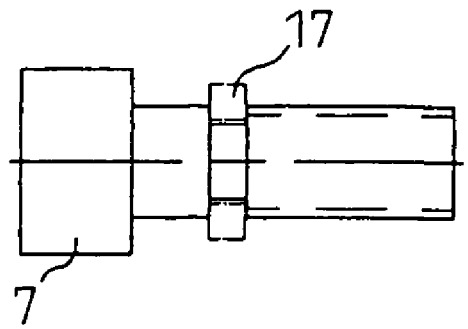

FIGS. 2(*a*), 2(*b*) and 2(*c*) show the clamping tool fastening bolt 7. In these drawings, only the clamping tool fastening bolt 7 is shown. The stopper fastening bolt 6 can be formed into the same shape as that of clamping tool fastening bolt 7. In FIG. 2(*a*), the clamping tool fastening bolt 7 is attached to the wedge-type holder clamping tool 4. The fastening bolt is provided with, for example, an elastic element in the form of a ring 17 such as a lock washer or a spring washer. The elastic ring pushes the wedge-type holder clamping tool 4 (or the stopper clamping tool 3 in the case of the fastening bolt 6) in a direction D away from the clamping device upon loosening the fastening bolt when the wedge-type stopper clamping tool 3 or the wedge-type holder clamping tool 4 is to be removed from the clamping device. Therefore, the wedge-type stopper clamping tool 3 or the wedge-type holder clamping tool 4 can be attached to or removed form the clamping device by the use of only one fastening bolt provided with the elastic ring. In order to attach the elastic ring to the fastening bolt, a slit 10 can be provided in the fastening bolt as shown in FIG. 2(*b*) and the elastic ring is attached to the slit as shown in FIG. 2(*c*).

Figure 3:
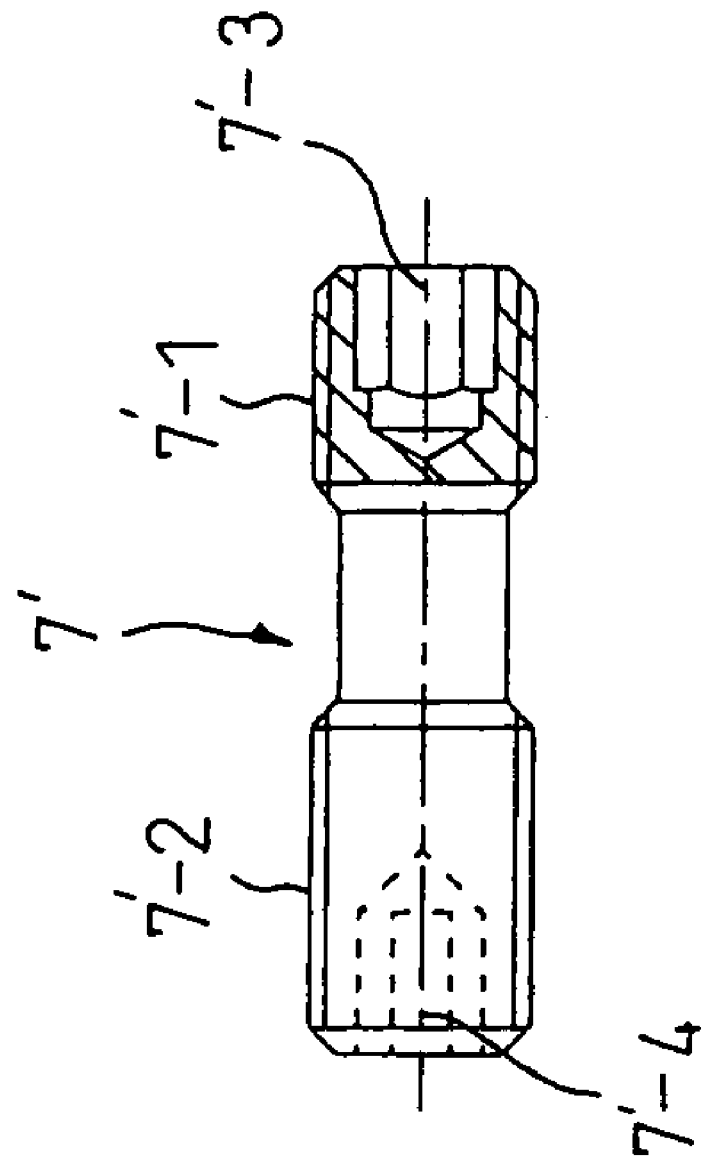
FIG. 3 is a side view of a double-threaded fastening bolt according to the present invention.

Furthermore, as shown in FIG. 3, in lieu of using an elastic ring 17, there can be used a fastening bolt 7' with left and right-hand screw threads, i.e., a left-hand thread 7'-1 and right-hand thread 7'-2. When fastening bolts with the left and right-hand screws are used, the bolt through holes 8', 9' in the wedge-type stopper clamping tool 3 and the wedge-type holder clamping tool 4 are replaced with threaded holes having the same pitch as that of the corresponding thread of the corresponding thread of the fastening bolts. For example, the left-hand thread is used for the threaded holes of the wedge-type holder clamping tools 3, 4 because the right-hand thread is used for the threaded holes of a conventional clamping device 1 (for example, a tool rest including an automatic copying lathe). Accordingly, for example, when the tool holder 5 is attached, the fastening bolt 7' with the left and right-hand screws is rotated in an attaching direction, so that the wedge-type holder clamping tool 4 is moved in a direction to clamp the tool holder 5, so as to clamp the tool holder 5 to the support body 1A. On the other hand, the fastening bolt 7' with the left and right-hand screws is rotated in a removing direction, so that the wedge-type holder clamping tool 4 is positively moved away from the tool holder 5 so as to remove the tool holder 5 from the support body 1A. Similar to the above, when the stopper block 2 is secured by the wedge-type stopper clamping tool 3, the block can be attached or removed by use of fastening bolt 6 with the left and right-hand screws. Thus, the wedge-type stopper clamping tool 3 or the wedge-type holder clamping tool 4 can be attached to or removed from the clamping device by use of only the fastening bolt with the left and right-hand screws. It will be appreciated that the device can be made smaller because the fastening bolt has no portion whose diameter is larger than the diameter of the threaded portions. Namely the clamping device can be applied to a tool holder having a small shaft.

The wedge-type holder clamping tool for attaching the tool holder to the clamping device with stability will be described below. In order to attach the tool holder to the clamping device with further stability, as shown in FIGS. 4(*a*-1) to 4(*c*-2), the wedge-type holder clamping tool 4 is provided with pressing bolts 18-1, 18-2, 18-3 for pressing against the side face 14, a top face or a corner 19 of the tool holder 5. FIGS. 4(*a*-1) to 4(*b*-2) show the pressing bolt for pressing against the side face 14. FIGS. 4(*c*-1) and 4(*c*-2) shows the pressing bolt for pressing against the corner 19. As described above, the wedge-type holder clamping tool is provided with the pressing bolt so that the tool holder can be appropriately attached to the side face and the bottom face of the groove of the clamping device with stability.

In order to further accurately position the tool holder 5 in the axial direction thereof, according to the present invention, the stopper block 2 can be provided with an adjusting bolt 20 or a positioning bar 23 as adjusting means, as shown in FIGS. 5(*a*-1) to 5(*b*-4). As shown in FIG. 5(*a*-1), the first adjusting bolt 20 extends through the stopper block 2 along the central axis thereof, and has a maximum length that is larger than the maximum length of the stopper block. The end face of the adjusting bolt that is in contact with the rear end of the tool holder has a diameter smaller than that of the adjusting bolt. The first adjusting bolt 20 positions the stopper block at a predetermined position by use of the wedge-type stopper clamping tool 3. The adjusting bolt 20 provided in the stopper block 2 positions the tool holder at a predetermined position. As shown in FIG. 5(*b*-3), the second positioning bar 23 is inserted into a hole that extends through the stopper block 2 along the central axis thereof. The positioning bar 23 is secured and positioned by a securing bolt 21 and a positioning screw 22 that are engaged in threaded holes provided in one face of the stopper block. The second positioning bar 23 positions the stopper block at a predetermined position by use of the wedge-type stopper clamping tool 3. As shown in FIG. 5(*b*-3), the chamfered end of the positioning bar 23 on the side of the bar that faces the tool holder is pressed against the tool holder to position the tool holder by use of the positioning screw 22 provided in the stopper block 2. After that, the positioning bar 23 is secured by the securing bolt 21. This enables the tool holder to be extremely accurately positioned at a predetermined position.

Another means for positioning the tool holder 5 in the axial direction thereof will be described below. As shown in FIGS. 6(*a*-1) to 6(*c*-2), V-shaped cuts or recesses 24 are provided at a longitudinal corner of the tool holder 5. In addition, the wedge-type holder clamping tool is provided with at least one pressing bolt 18-1 (in FIGS. 6(*a*-1)(*a*-2)), pressing bolt 18-2 (in FIGS. 6(*b*-1) (*b*-2)), and pressing bolt 18-3 (in FIGS. 6(*c*-1)(*c*-2)). At least one pressing bolt 18-1, 18-2, 18-3 is pressed against an inclined surface (near the stopper block) of the V-shaped cut 24, so that the tool holder 5 can be pressed against the stopper block 2 at a predetermined pressure. The pressing bolt 18-1 is engaged toward the side face of the clamping device; the pressing bolt 18-2 is engaged toward the bottom face of the groove of the clamping device; and the pressing bolt 18-3 is engaged at a predetermined angle with respect to the side face and the bottom face of the groove of the clamping device. By means of any of the pressing bolts, the tool holder can be pressed against the side face and the bottom face of the groove of the clamping device. The top end of the pressing bolt 18-1, 18-2, 18-3 is shaped into a hemisphere or a cone corresponding to the V-shaped cut. However, if no cut is provided, the top end can be flat.

Figure 9:
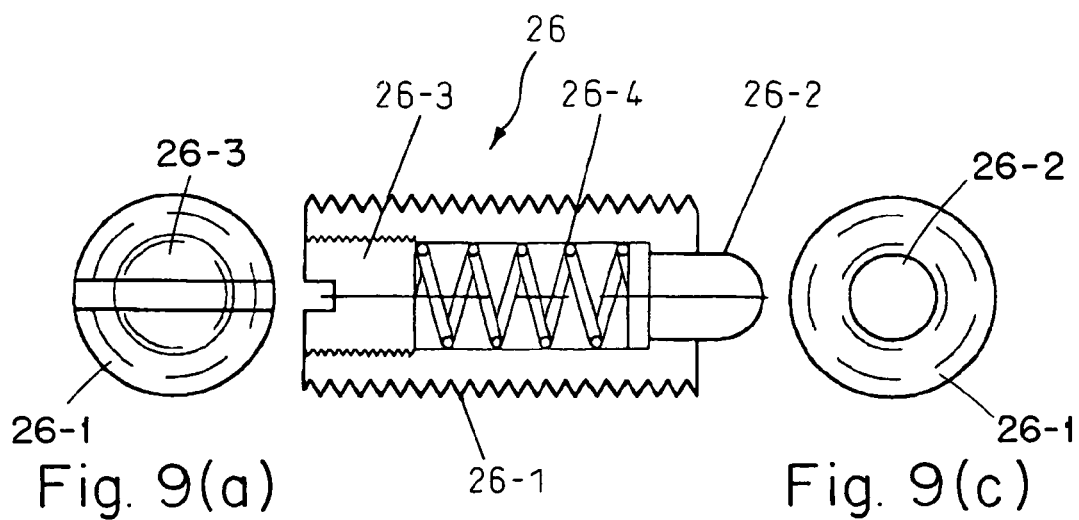
FIG. 9(*a*) is an end view of a spring plunger screw according to the present invention.

The wedge-type holder clamping tool that attaches the tool holder to the clamping device with further stability will be described below. In order to attach the tool holder to the clamping device with further stability, the wedge-type holder clamping tool 4 is provided with the elastic pressing tool or the pressing bolt with the elastic pressing tool in place of the pressing bolts shown in FIGS. 6(*a*-1) to 6(*c*-2). Also, the elastic pressing tool or the pressing bolt with the elastic pressing tool is pressed against the side face 14, the top face or the corner 19 of the tool holder 5. As described above, the wedge-type holder clamping tool is provided with the elastic pressing tool or the pressing bolt with the elastic pressing tool, so that the tool holder can be appropriately attached to the side face and the bottom face of the groove of the clamping device with stability. A spring coil, an elastic rubber, a plate spring, a spring washer, a coned disc spring, a spring plunger screw or the like is used as the elastic pressing tool and in the pressing bolt with the elastic pressing tool. As an example of the elastic pressing tool and the pressing bolt with the elastic pressing tool, a spring plunger screw is shown in FIGS. 9(*a–c*). The spring plunger screw 26 is provided with: (i) a screw portion 26-1 that presses the tool holder against the abutment surfaces of the groove 1B, (ii) a top end (having a round or flat end) 26-2 that abuts with the tool holder, (iii) a plug screw 26-3 that secures a spring, and (iv) a spring 26-4 that presses the tool holder via the top end thereof.

Means for positioning the tool holder 5 in the axial direction thereof by using the elastic pressing tool or the pressing bolt with the elastic pressing tool in place of the above pressing bolts will be described below. In such means, the V-shaped cuts 24 are provided at a longitudinal corner of the tool holder 5 shown in FIGS. 6(*a*-1) to 6(*c*-2), and the wedge-type holder clamping tool is provided with at least one pressing bolt with the elastic pressing tool (for example, the spring plunger screw in FIGS. 9*a-c*) in place of the pressing bolts shown in FIGS. 6(*a*-1) to 6(*c*-2). In such means, at least one pressing bolt with the elastic pressing tool is pressed against such an inclined surface (near the stopper block) of the V-shaped cut 24, so that the tool holder 5 can be pressed against the stopper block 2 at a predetermined pressure. The pressing bolt with the elastic pressing tool used in place of the pressing bolt shown in FIGS. 6(*a*-1)(*a*-2) is engaged toward the side face of the clamping device; the pressing bolt with the elastic pressing tool used in place of the pressing bolt shown in FIGS. 6(*b*-1)(*b*-2) is engaged toward the bottom face of the groove of the clamping device; and the pressing bolt with the elastic pressing tool used in place of the pressing bolt shown in FIGS. 6(*c*-1)(*c*-2) is engaged at a predetermined angle with respect to the side face and the bottom face of the groove of the clamping device. By means of any of the pressing bolts with the elastic pressing tool (e.g., a spring plunger screw, a spring coil, an elastic rubber, a plate spring, a spring washer, a coned disc spring or the like), the tool holder can be pressed against the side face and the bottom face of the groove of the clamping device. The top end of the elastic pressing tool that abuts with the V-shaped cut 24 is shaped into a hemisphere or a cone corresponding to the V-shaped cut. However, if no cut is provided, the top end can be flat.

Figure 7A:
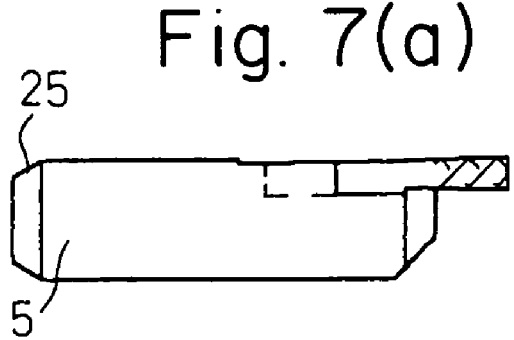
FIG. 7(*a*) is a side view of an alternative form of tool holder according to the present invention.
Figure 7B:
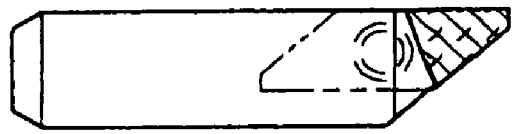
Figure 7C:
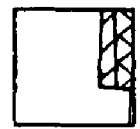
Figure 8:
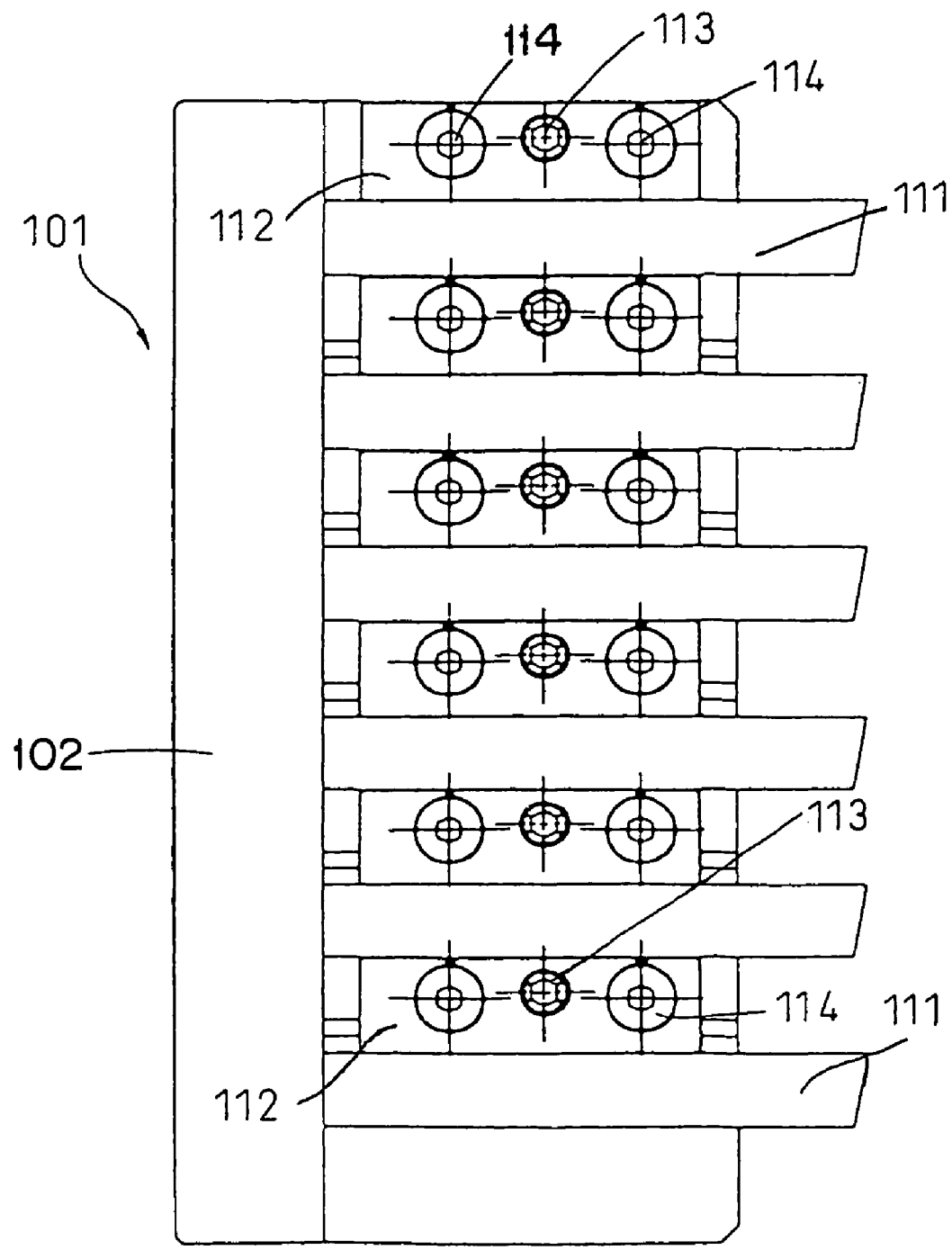
FIG. 8 is a view of a prior art tool assembly in which a plurality of tool holders are clamped.

Furthermore, in the present invention, the attaching efficiency and the positioning of the tool holder 5 can be further improved by modifying a part of the tool holder 5. As shown in FIGS. 7(*a*–*c*), in order to improve the attaching efficiency of the tool holder 5, a chamfer 25 (e.g., a back taper, a truncated cone shape, spherical shape or plural combinations of the back taper, a truncated cone shape and a spherical shape) is provided on the rear end of the tool holder, so that the tool holder can be easily attached to the support body 1A.

Furthermore, in the clamping device according to the present invention, a conventional long tool holder can be attached in place of the stopper block 2, by using both the wedge-type stopper clamping tool 3 and the wedge-type holder clamping tool 4.

Figure 10:
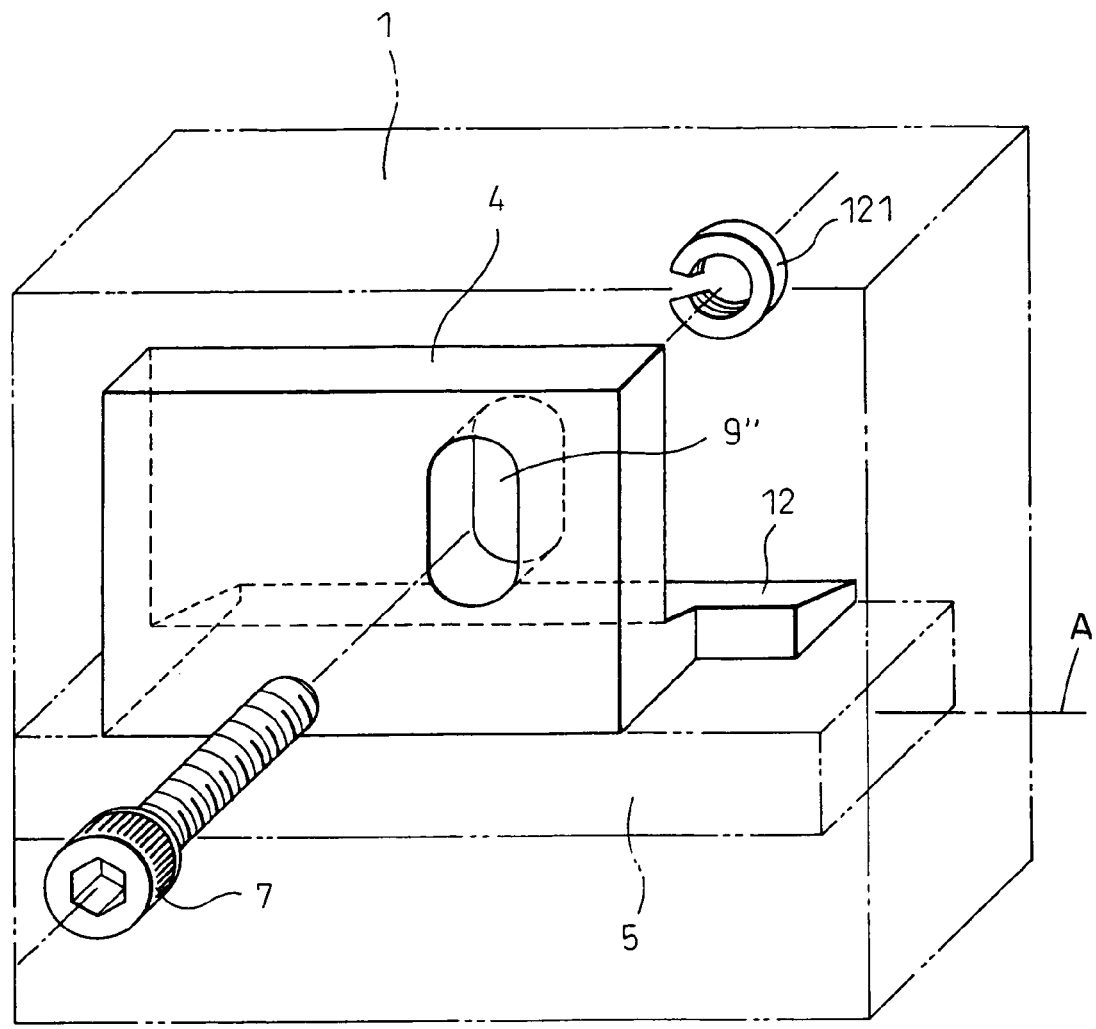
FIG. 10 is a schematic perspective view of a tool assembly according to another embodiment of the present invention wherein a fastening screw is secured by a spring nut.
Figure 11:
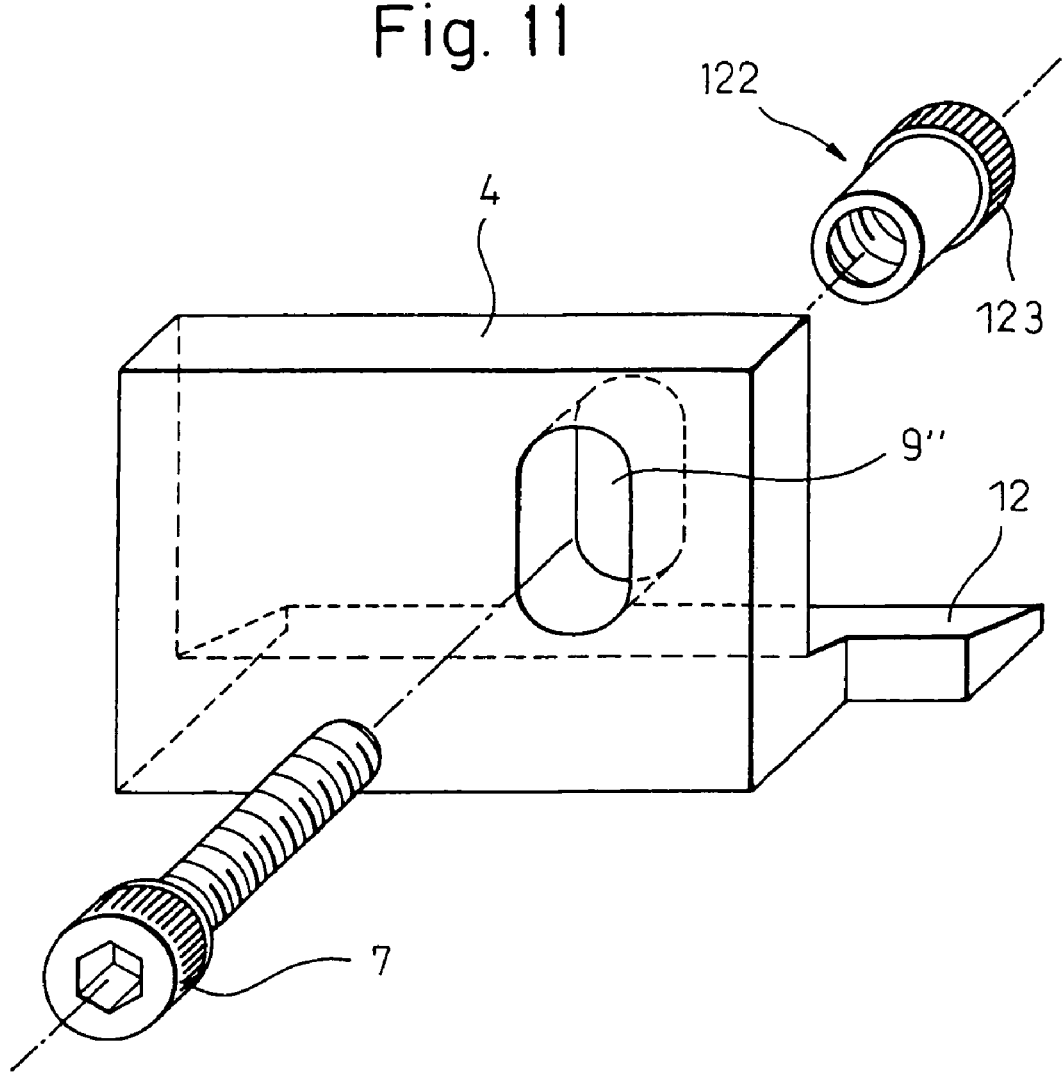
FIG. 11 is a perspective view through a tool holder clamp according to another embodiment of the invention, wherein the fastening screw is secured by a sleeve nut.

The holder clamping tool 4 can be held in place as shown in FIGS. 10 and 11. As shown in FIG. 10, in the clamping device of the tool holder according to the present invention, the fastening bolt 7 of the wedge-type holder clamping tool 4 is attached to a spring nut 121 to define a thread connection. The spring nut 121 prevents the clamping tool fastening bolt 7 from being detached from the wedge-type holder clamping tool 4, and the wedge-type holder clamping tool 4 is held between the nut 121 and a head of the bolt 7.

As shown in FIG. 11, in the clamping device of the tool holder according to the present invention, the fastening bolt 7 of the wedge-type holder clamping tool 4 is fastened to a threaded sleeve-type nut 122 to define a thread connection. Rotation of the nut 122 is facilitated by a knurled ring 123.

In each of FIGS. 10 and 11, the holder clamping tool 4 has a slot 9" elongated in a direction transversely of the axis A and through which the bolt 7 passes. As a result, by loosening the bolt 7 and slightly displacing the holder clamping tool 4 out of the groove 1B, the clamping tool 4 can be raised away from the tool holder in order to allow removal (or insertion) of the tool holder even while the fastening bolt 7 remains secured in the support body 1A. Thus, with any structure having the feature described with reference to FIGS. 10 and 11, the tool holder 4 can be temporarily fastened without completely detaching the clamping tool fastening bolt 7 or the holder clamp 4.

Other types of wedge-type holder clamping tools 4 which can temporarily fasten the tool holder 5 without fully detaching the clamping tool 4 or the fastening bolt 7 will be described below with reference to FIGS. 12 to 16, wherein a spring is provided which presses the holder clamp 4 against the tool holder 5 to hold the latter in place.

Figure 12:
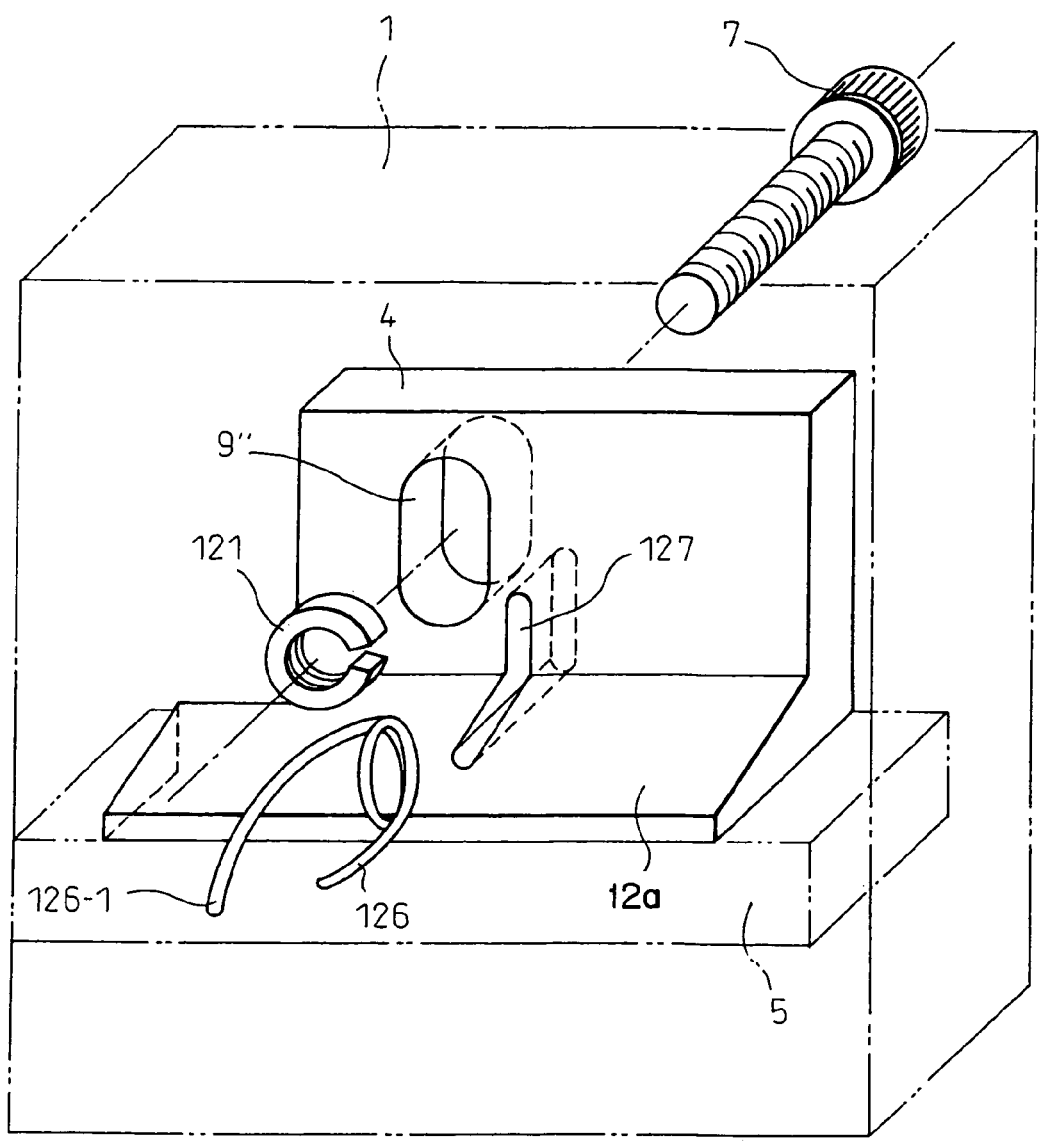
FIG. 12 is a view similar to FIG. 10, except that the tool assembly is shown from an opposite side, and a biasing spring is disposed therein.

As shown in FIG. 12, in the clamping device of the tool holder according to the present invention, the fastening bolt 7 is fastened to the spring nut 121. An upwardly extending spring mounting slit 127 is provided in the holder clamp 4 to one side of the elongated through hole 9" of the wedge-type holder clamping tool 4. A biasing spring 126 extends into the slit so that a spring end 126-1 exerts an elastic biasing force in a direction to increase a distance between the clamping device and a wedge-type side face 12*a* of the wedge-type holder clamping tool 4, so that the holder clamping tool 4 presses against the holder 5. Thus, the tool holder 5 remains temporarily fastened to the support body 1A even while the clamping bolt fastening tool 7 is loosened but still secured to the support body 1A. In that state, the tool holder 5 can be inserted or removed.

Figure 13:
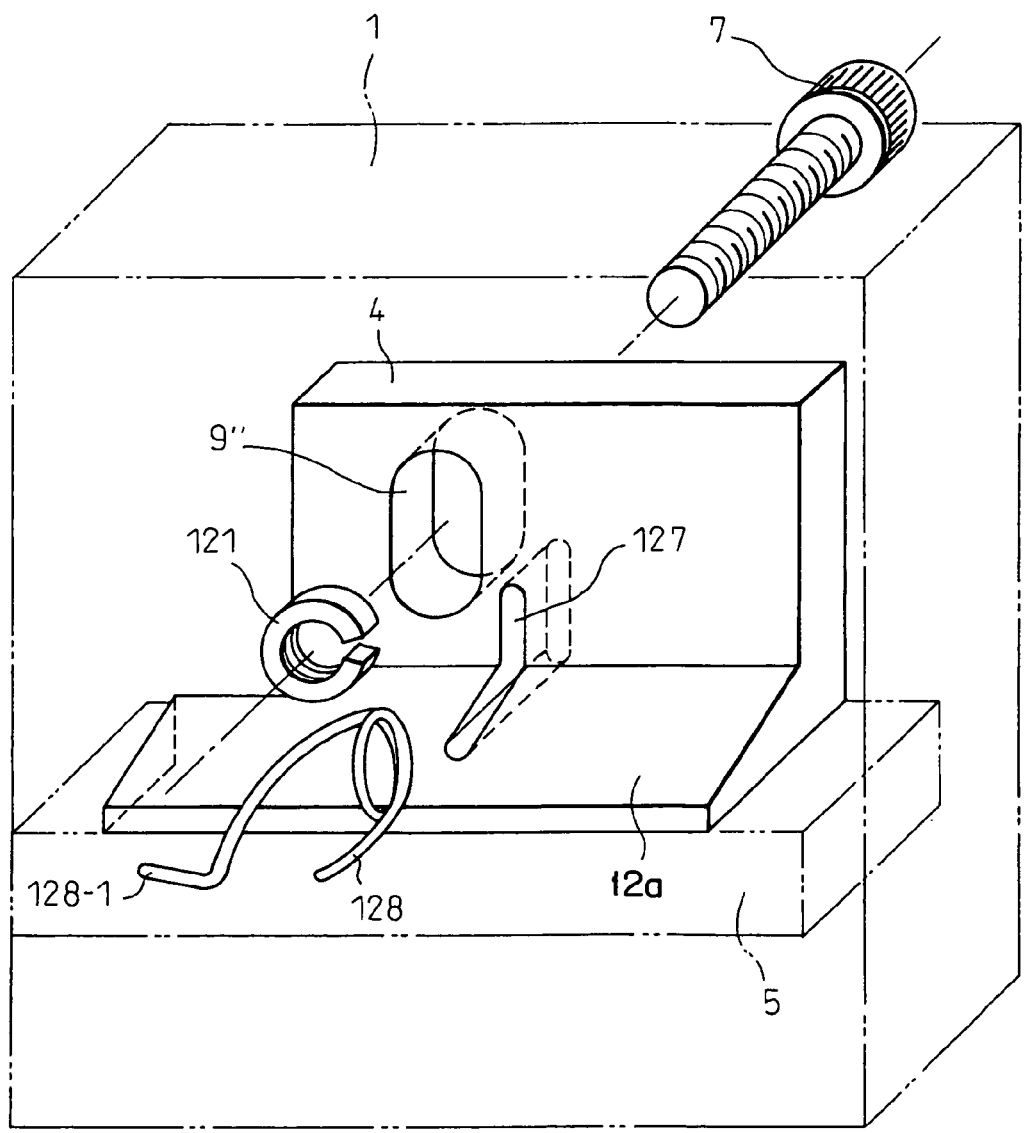
FIG. 13 is a view similar to FIG. 12 employing a different type of spring.

As shown in FIG. 13, the biasing spring 128 has an end 128-1 which exerts the elastic biasing force described above.

Figure 14:
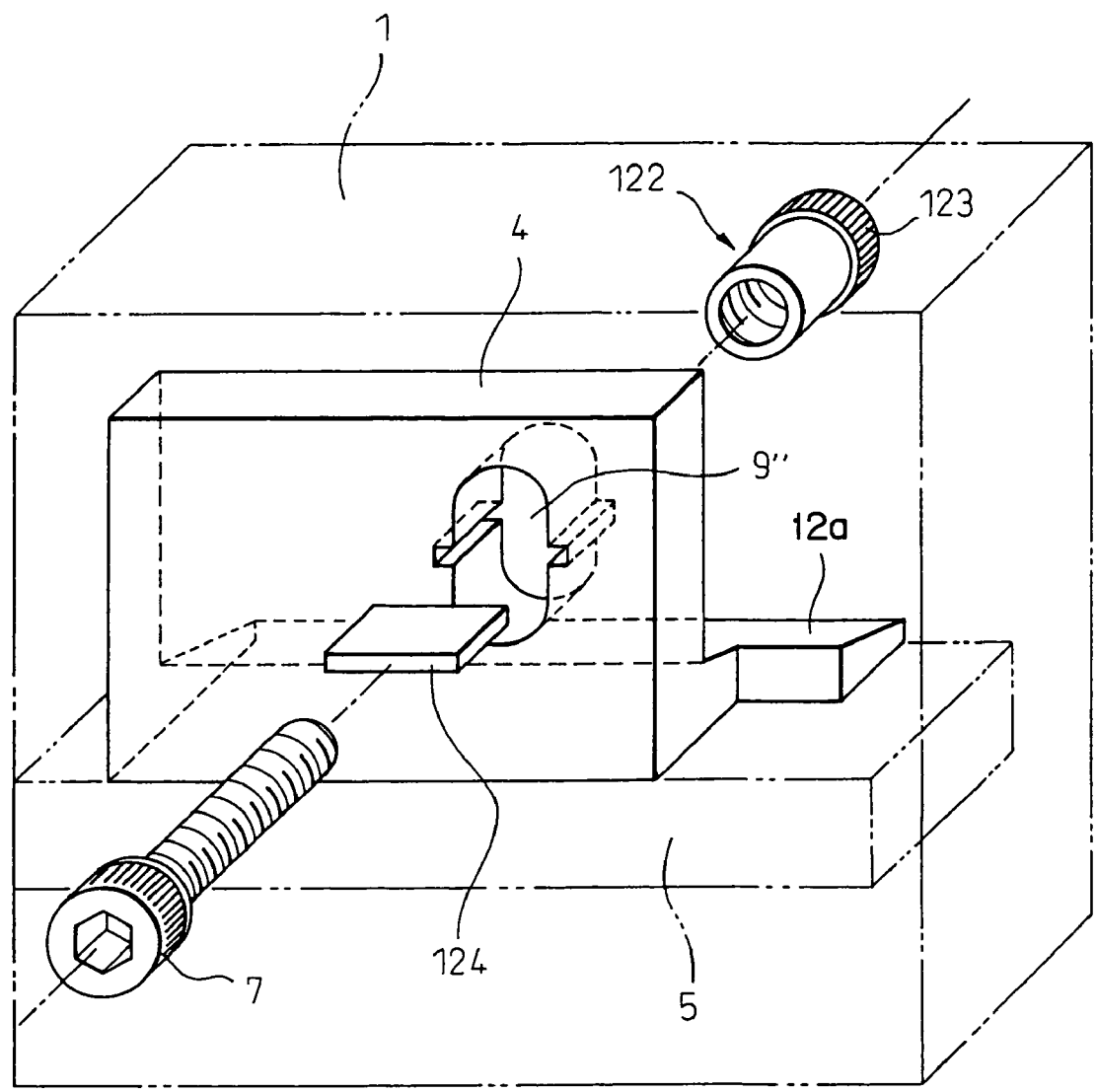
FIG. 14 is a perspective view of a tool assembly according to a further embodiment of the present invention.

As shown in FIG. 14, the fastening bolt 7 is fastened to the sleeve nut 122. A leaf spring 124 is provided in the wedge-type holder clamping tool 4 between the sleeve nut 122 and a wedge-type side face 12*a* of the wedge-type holder clamping tool to temporarily fasten the tool holder 5 to the clamping device. Accordingly, the leaf spring 124 exerts an elastic force in a direction to increase a distance between the wedge-type side face 12*a* and the sleeve nut 122. Thus, the holder clamping tool 4 presses against the tool holder 5, wherein the tool holder 5 remains temporarily fastened to the clamping device, even when the clamping bolt fastening tool 7 is loosened.

Figure 15:
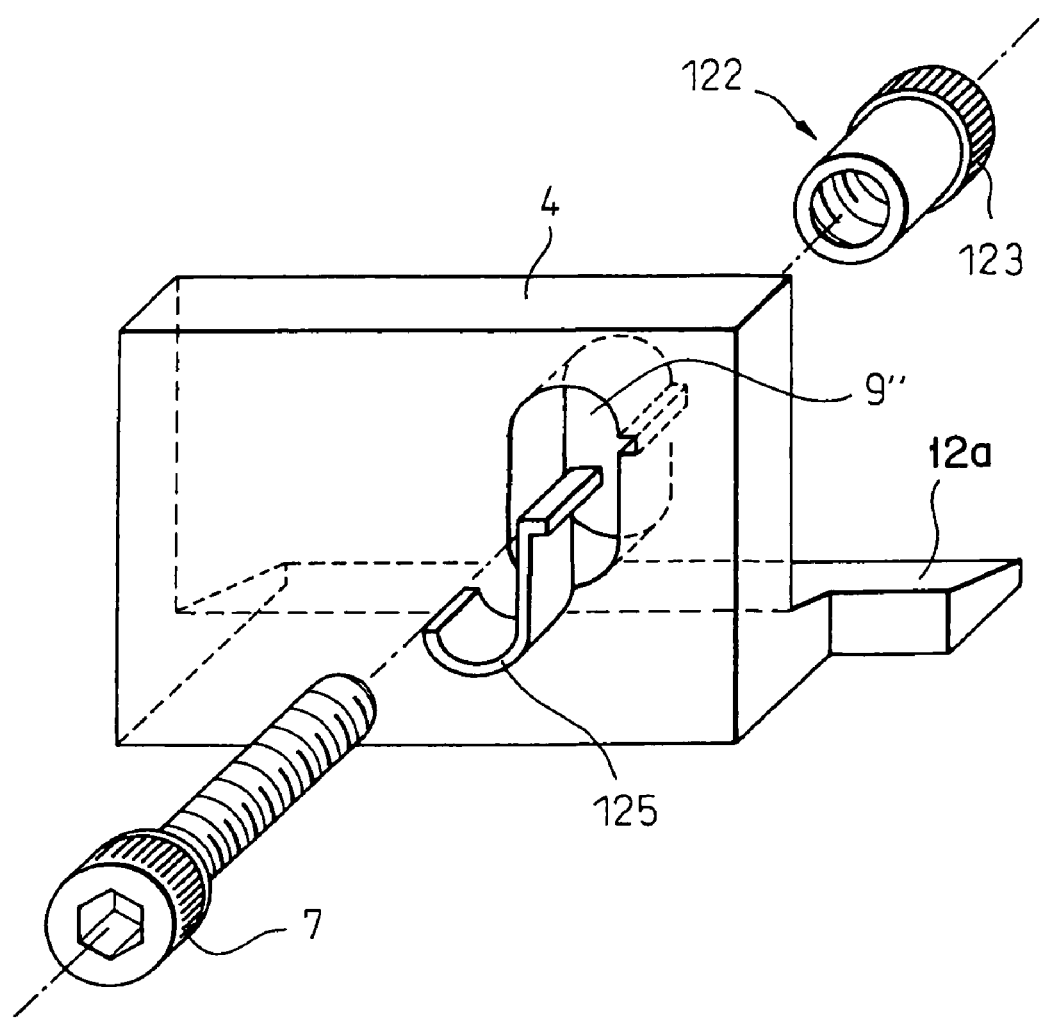
FIG. 15 is a perspective view of a tool holder clamp according to yet another embodiment of the present invention.

As shown in FIG. 15, a coil spring 125 having a fixed end is provided in place of the leaf spring 124. Accordingly, the coil spring 125 having a fixed end exerts an elastic force in a direction to increase a distance between the wedge-type side face 12*a* and the sleeve nut 122, so that the tool holder 5 is temporarily fastened to the clamping device, when the clamping bolt fastening tool 7 is loosened.

Figure 16:
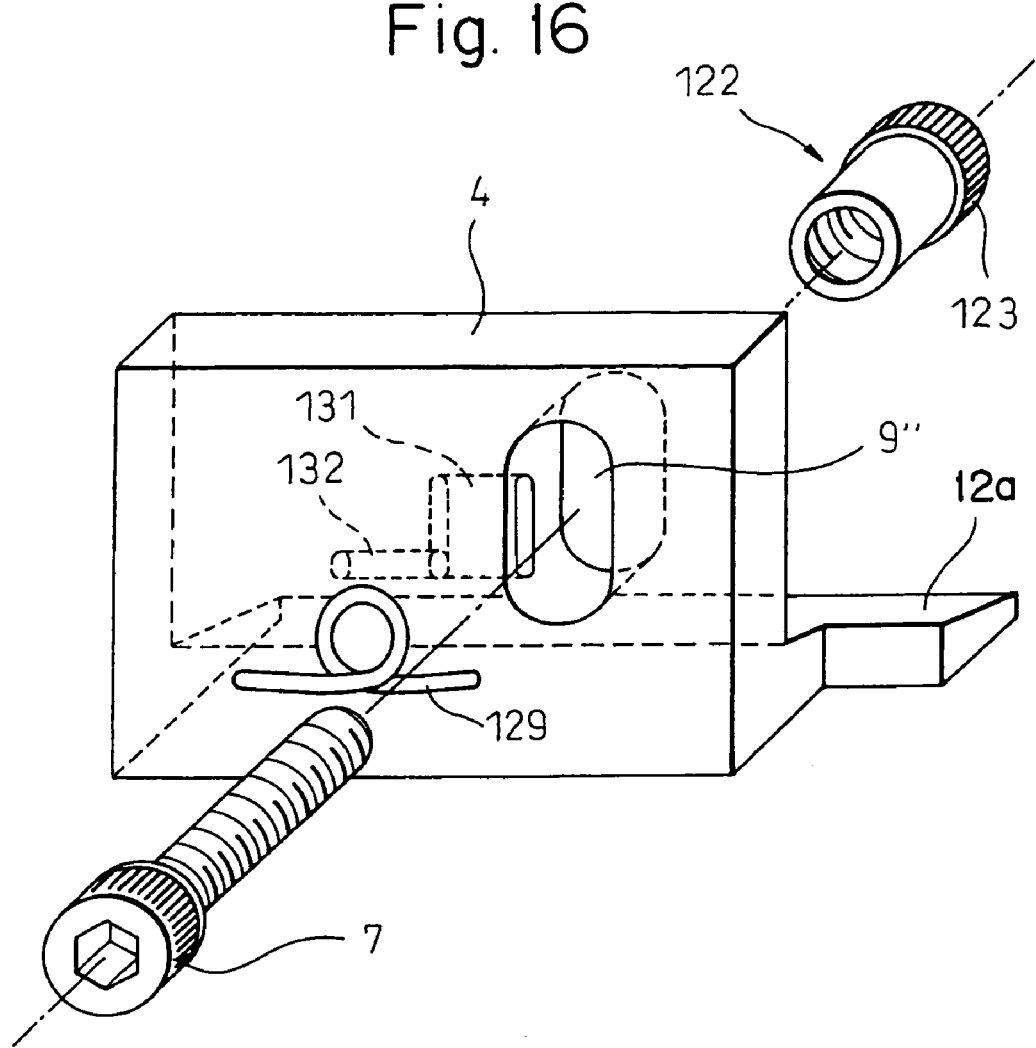
FIG. 16 is a view similar to FIG. 15 of yet another embodiment according to the present invention.

As shown in FIG. 16, the wedge-type holder clamping tool 4 is provided with the sleeve nut 122. A laterally biasing spring mounting slit 131 is provided in one of opposite side surface portions of the bolt through hole 9" of the wedge-type holder clamping tool 4 in the minor axis direction thereof. A laterally biasing spring 129 is mounted in the laterally biasing spring mounting slit. One end of the laterally biasing spring 129 is inserted into a hole 132 of the laterally biasing spring mounting slit, and the other end of the laterally biasing spring 129 is disposed between the clamping device fastening bolt 7 and the wedge-type side face 12*a*. With this structure, the laterally biasing spring 129 exerts an elastic force in a direction to increase a distance between the wedge-type side face 12*a* and the sleeve nut 122, so that the tool holder 5 is temporarily fastened to the clamping device 1, when the bolt 7 is loosened.

Therefore, with any structure described with reference to FIGS. 12 to 16, the tool holder 5 can be temporarily fastened without detaching the clamping device fastening bolt 7 from the wedge-type holder clamping tool 4. The tool holder 5 can also be inserted and detached from the support body 1A with the bolt 7 being loosened. Moreover, the features disclosed in connection with FIGS. 10–16 can be employed in conjunction with a part which pushes the clamp in a direction away from the groove 13 upon loosening the bolt 7, such as the elastic ring 17.

EFFECT OF THE INVENTION

In the clamping device for the tool holder according to the present invention, the number of fastening bolts for the tool holder can be reduced; the jack-up screws can be dispensed with; and a miniaturization and the simplification of the wedge-type holder clamping tool can be achieved. Thus, the time required for attachment/removal of the tool holder can be reduced without modifying the tool holder and the clamping device for the tool holder that are currently used.

Furthermore, in the clamping device for the tool holder according to the present invention, the tool holder can be disposed at an accurate position, and can be repeatedly disposed at the same accurate position even when replaced. Also, in the clamping device for the tool holder according to the present invention, the tool holder can be temporarily fastened without being detached from the clamping device and without detaching the clamping tool fastening bolt from the wedge-type holder clamping tool when the tool holder is attached to and detached from the clamping device.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool assembly comprising a support body, a clamping device, and a tool holder clamped in the support body by the clamping device;

the support body including a groove in which the tool holder is disposed, the groove including an abutment surface arrangement against which the tool holder abuts, the clamping device including:
  a stopper block mounted in the groove and abutting against the tool holder, for positioning the tool holder along an axis;
  a stopper clamp including: a first wedge portion wedged in the groove and arranged to press against the stopper block in a direction transversely of the axis, and
  a first mounting portion having a first through-hole;
  a first fastener including a first shank extending through the first through-hole and including a first thread portion threadedly secured to the support body by a first thread connection to fasten the stopper clamp to the support body, the first fastener including a stopper clamp-displacing part for displacing the stopper clamp away from the support body in response to unscrewing of the first fastener;
  a holder clamp including:
    a second wedge portion wedged in the groove and arranged to press against the tool holder in a direction transversely of the axis, and
    a second mounting portion having a second through-hole; and
  a second fastener including a shank extending through the second through-hole and including a second thread portion secured to the support body by a second threaded connection to fasten the holder clamp to the support body, the second fastener including a holder clamp displacing part for displacing the holder clamp away from the support body in response to unscrewing of the second fastener.

2. The tool assembly according to claim 1 wherein each of the first and second fasteners includes a head joined to the shank, wherein each of the clamp-displacing part and the holder clamp-displacing part comprises an elastic element situated between the head and the respective stopper clamp and holder clamp.

3. The tool assembly according to claim 2 wherein the elastic element comprises a ring mounted on the shank.

4. The tool assembly according to claim 1 wherein each of the first and second shanks includes both a right-hand thread and a left-hand thread, wherein one of the right- and left-hand threads of the first shank is thredely connected to the first through-hole and constitutes the stopper clamp-displacing part thereof, and one of the right- and left- hand threads of the second shank is threadedly connected to the second through-hole and constitutes the holder clamp-displacing part thereof.

5. The tool assembly according to claim 1 wherein the holder clamp carries an adjustable pressing bolt arranged to press against a portion of the tool holder.

6. The tool assembly according to claim 5 wherein the tool holder includes a generally V-shaped recess for receiving the pressing bolt.

7. The tool assembly according to claim 1 wherein the stopper block carries an adjusting member engageable with the tool holder for adjusting a position of the tool holder along the axis.

8. The tool assembly according to claim 7 wherein the adjusting member comprises a threaded bolt.

9. The tool assembly according to claim 7 wherein the adjusting member comprises a slidable positioning bar, and a threaded positioning bolt engageable with the positioning bar for adjusting a position of the positioning bar.

10. The tool assembly according to claim 1 further including a spring nut in which the second thread portion is secured, to define the second threaded connection, the second fastener including a head joined to the shank thereof; the holder clamp being secured between the head and the spring nut.

11. The tool assembly according to claim 10 further including a sleeve nut in which the second thread portion is secured, to define the second threaded connection, the second fastener including a head joined to the shank thereof; the holder clamp being secured between the head and the sleeve nut.

12. The tool assembly according to claim 1 further including a spring arranged to yieldably press the holder clamp against the tool holder.

13. The tool assembly according to claim 12 wherein the second through-hole is elongated in a direction enabling the holder clamp to move relative to the second fastener and away from the tool holder when the second fastener is loosened.

14. The tool assembly according to claim 12 wherein the spring extends into a slit formed in the holder clamp.

15. The tool assembly according to claim 12 wherein the spring comprises a leaf spring.

16. The tool assembly according to claim 1 wherein the first fastener constitutes the only fastener securing the stopper clamp to the support body, and the second fastener constitutes the only fastener securing the holder clamp to the support body.

* * * * *